US012394258B2

(12) United States Patent
Tokuda

(10) Patent No.: US 12,394,258 B2
(45) Date of Patent: Aug. 19, 2025

(54) ABNORMALITY DETECTION APPARATUS FOR WHEEL ASSEMBLY

(71) Applicant: SUMITOMO RUBBER INDUSTRIES, LTD., Kobe (JP)

(72) Inventor: Kazuma Tokuda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 281 days.

(21) Appl. No.: 18/122,475

(22) Filed: Mar. 16, 2023

(65) Prior Publication Data

US 2023/0316825 A1 Oct. 5, 2023

(30) Foreign Application Priority Data

Mar. 29, 2022 (JP) ................................ 2022-053638

(51) Int. Cl.
*G07C 5/08* (2006.01)
*G01M 17/00* (2006.01)
*G01M 17/013* (2006.01)

(52) U.S. Cl.
CPC ......... *G07C 5/0808* (2013.01); *G01M 17/013* (2013.01); *G07C 5/0833* (2013.01)

(58) Field of Classification Search
CPC .. B60C 23/062; G01M 17/013; G07C 5/0808; G07C 5/0833
See application file for complete search history.

(56) References Cited

U.S. PATENT DOCUMENTS

| 6,385,553 | B1 * | 5/2002 | Naito | B60C 23/062 |
| | | | | 73/146.2 |
| 9,134,194 | B2 * | 9/2015 | Wada | B60C 23/0427 |
| 9,911,250 | B2 * | 3/2018 | Steinlechner | B60Q 9/00 |
| 2003/0080857 | A1 | 5/2003 | Hartmann et al. | |

(Continued)

FOREIGN PATENT DOCUMENTS

DE 10 2013 211 697 A1 12/2014
EP 1 308 320 A2 5/2003

(Continued)

OTHER PUBLICATIONS

Extended European Search Report for European Application No. 23160918.1, dated Aug. 4, 2023.

*Primary Examiner* — Tyler J Lee
(74) *Attorney, Agent, or Firm* — Birch, Stewart, Kolasch & Birch, LLP

(57) ABSTRACT

An abnormality detecting apparatus includes a signal obtaining unit, a first index calculation unit, a spectrum calculation unit, a standardization unit, and a second index calculation unit. The signal obtaining unit obtain signals indicating a rotation speed of the wheel assembly, as pulses having a rise. The first index calculation unit calculates a first index indicating a temporal variation of the rise of each of the pulses. The spectrum calculation unit calculates a frequency spectrum of rotational orders from a first order to an mth order of the first index calculated for each of the pulses. The standardization unit standardizes a gain for each rotational order of the frequency spectrum using a mean value and a standard deviation of the gain for each rotational order when there is no abnormality. The second index calculation unit calculates a second index for determining whether there is an abnormality.

18 Claims, 10 Drawing Sheets

(56) References Cited

U.S. PATENT DOCUMENTS

| | | | |
|---|---|---|---|
| 2007/0299573 A1* | 12/2007 | Carlstrom | B60T 8/885 |
| | | | 701/31.4 |
| 2010/0013617 A1* | 1/2010 | Fujita | B60C 23/062 |
| | | | 340/443 |
| 2014/0053625 A1* | 2/2014 | Wada | G01L 27/00 |
| | | | 73/1.66 |
| 2016/0163131 A1 | 6/2016 | Steinlechner et al. | |

FOREIGN PATENT DOCUMENTS

| | | |
|---|---|---|
| JP | 2016-530488 A | 9/2016 |
| WO | WO 2020/016108 A1 | 1/2020 |

* cited by examiner

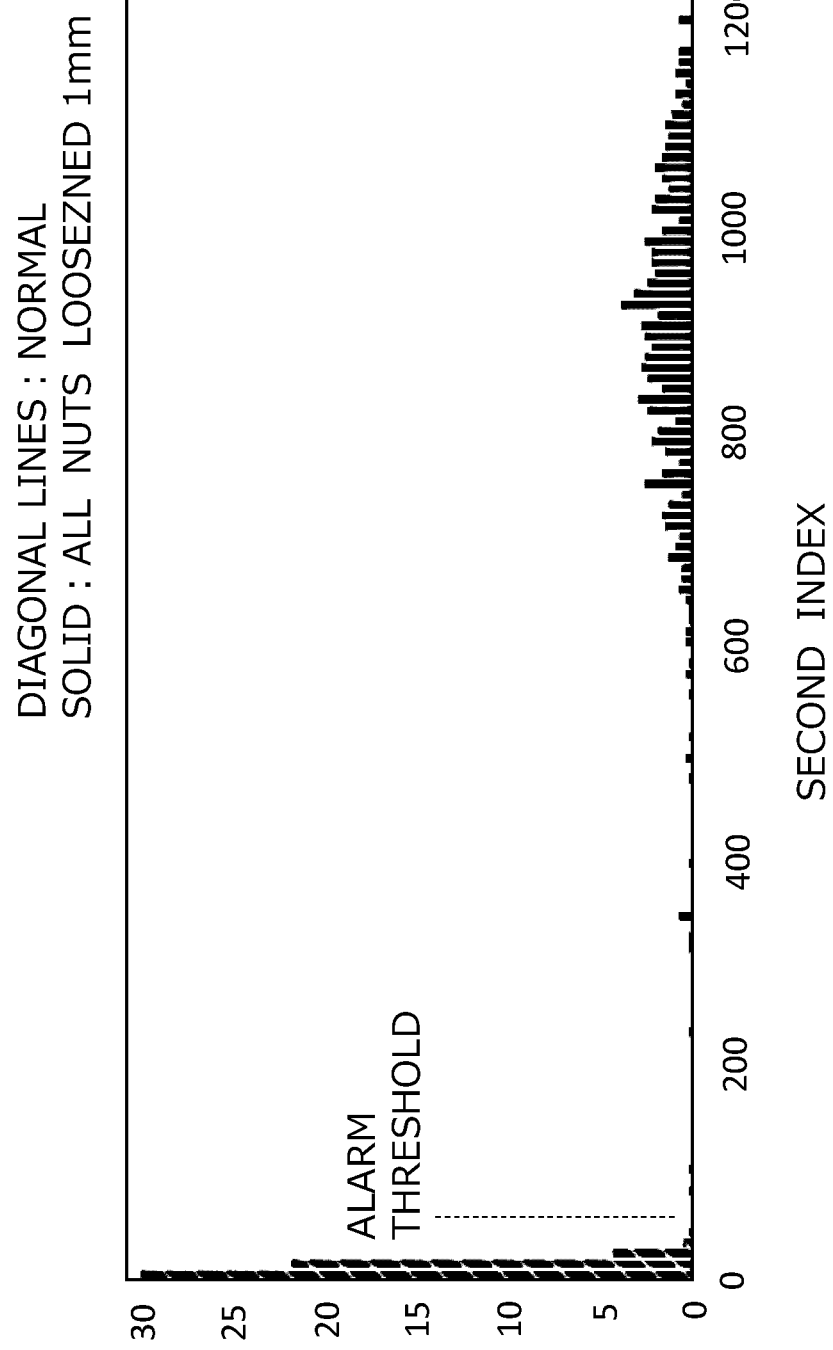

ABNORMALITY DETECTION APPARATUS FOR WHEEL ASSEMBLY

CROSS REFERENCE TO RELATED APPLICATION

This application claims a priority to Japanese Patent Application No. 2022-053638 filed on Mar. 29, 2022, which is hereby incorporated by reference in its entirety.

FIELD OF INVENTION

The present invention relates to an abnormality detection apparatus, an abnormality detection method, and an abnormality detection program for detecting an abnormality that occurs in a wheel assembly attached to an axle.

BACKGROUND

It is important to be capable of early detecting an abnormality that occurs in a wheel assembly and taking a countermeasure in order to keep a vehicle travelling appropriately. Examples of an abnormality that occurs in a wheel assembly include slight wobbling of the wheel assembly and damage to a tire. Wobbling of a wheel assembly is typically caused by loosening of wheel nuts. If a vehicle keeps traveling while the wheel nuts are loose, the looseness gradually increases, which eventually may lead to a situation in which the wheel assembly comes off. Examples of damage to a tire include a pinch-cut. A pinch-cut is damage to a reinforcing member that is included in a tire, due to a side wall portion being pinched between a road surface and a flange of a wheel rim when the tire is significantly deformed due to an impact. If the degree of the pinch-cut is serious, the tire rapidly deflates, which makes the vehicle unable to travel any longer. If the degree of the pinch-cut is slight, the tire will not rapidly deflate, and a driver may not notice the pinch-cut. However, if the vehicle keeps traveling in such a state with the pinch-cut, this may cause the tire to suddenly blowout or burst.

JP 2016-530488A discloses a sensor unit that detects loosening of a wheel attachment means for fixing a wheel to a hub, based on a pulse that is output from a rotation speed detection apparatus for detecting a rotation speed of the wheel of a vehicle. The rotation speed detection apparatus includes a multi-pole disc attached to the wheel, and a magnetic field sensor attached to the hub. The multi-pole disc is a magnetic encoder disc that includes pole regions of a predetermined number N, for example. When the multi-pole disc rotates along with the wheel, a magnetic field intensity corresponding to a rotational position of the multi-pole disc is detected by the magnetic field sensor. The magnetic field sensor outputs a measurement pulse including the respective pulse durations with respect to the pole regions.

According to JP 2016-530488A, since a pitch error usually occurs in the pole region of the multi-pole disc, each pulse duration is not equal to a mean pulse duration that depends on the wheel speed, but is fixedly set with respect to the corresponding pole region. If loosening occurs in the wheel attachment means, an additional periodical change occurs in each pulse duration. The frequency of the change corresponds to an integer multiple of the number of rotations of the corresponding wheel obtained by multiplying the number of rotations the number of the wheel attachment means.

In JP 2016-530488A, this fact described above is used to detect loosening of the wheel attachment means. More specifically, a frequency spectrum of the above periodical change over a single wheel rotation is calculated, and if an amplitude of the spectrum reaches a predetermined threshold or more in the wheel frequency, which is the number of the wheel attachment means or an integer multiple thereof, it is determined that the wheel attachment means is loose.

SUMMARY OF THE INVENTION

According to the investigation made by the inventors, the degree of change in amplitude of the wheel frequency of the above frequency spectrum depends on the type of wheel assembly including a tire, and the type of the vehicle. Accordingly, even if loosening occurs in the wheel attachment means, the amplitude will not always be the predetermined threshold or more at a specified wheel frequency. If the amplitude of the spectrum changes to decrease or the amplitude changes slightly, the loosening of the wheel attachment means may not be appropriately detected. Note that, this applies to not only the case in which loosening in the wheel attachment means is to be detected, but also the case in which wobbling of a wheel assembly and damage to a tire are to be detected based on a similar frequency spectrum.

An object of the present invention is to provide an abnormality detection apparatus, an abnormality detection program, and an abnormality detection method that can detect an abnormality that occurs in a wheel assembly more appropriately based on a signal representing a rotation speed of the wheel assembly.

An abnormality detection apparatus according to an aspect of the present invention is an abnormality detecting apparatus for detecting an abnormality that occurs in a wheel assembly that is provided with a signal obtaining unit, a first index calculation unit, a spectrum calculation unit, a standardization unit, and a second index calculation unit. The signal obtaining unit obtain signals indicating a rotation speed of the wheel assembly, as pulses having a rise. The first index calculation unit calculates a first index indicating a temporal variation of the rise of each of the pulses corresponding to one rotation of the wheel assembly. The spectrum calculation unit calculates a frequency spectrum of rotational orders from a first order to an mth order ($m \geq 1$) of the first index by performing frequency analysis on the first index calculated for each of the pulses. The standardization unit standardizes a gain for each rotational order of the frequency spectrum using a mean value and a standard deviation for each rotational order when there is no abnormality. The second index calculation unit calculates a second index for determining whether there is an abnormality, based on the standardized gain.

In the above abnormality detection apparatus, the abnormality may also be a pinch-cut that occurs in a tire included in the wheel assembly.

In the above abnormality detection apparatus, the abnormality may also be loosening of a fixing member for attaching and fixing a wheel included in the wheel assembly to an axle.

In the above abnormality detection apparatus, the second index may also be calculated using at least one of a sum and a square sum of absolute values from a first order to an mth order of the standardized gains.

The above abnormality detection apparatus may also include a determination unit configured to determine whether there is an abnormality, based on the calculated second index.

In the above abnormality detection apparatus, the determination unit may also set a threshold for determining whether there is an abnormality, based on a probability distribution that the second index follows if there is no abnormality.

The above abnormality detection apparatus may also include an alarm output unit configured to output an alarm if it is determined that there is an abnormality.

In the above abnormality detection apparatus, a configuration is also possible in which the signal representing the rotation speed of the wheel assembly is a signal that is output from a rotation speed sensor mounted in a vehicle, and the rotation speed sensor detects at least one of magnetic field and light that change in accordance with the rotation of the wheel assembly.

A non-transitory computer-readable medium according to another aspect of the present invention is a non-transitory computer-readable medium recording an abnormality detection program for detecting an abnormality that occurs in a wheel assembly attached to an axle, the abnormality detection program causing a computer to execute:
sequentially obtaining signals indicating a rotation speed of the wheel assembly, as pulses having a rise;
calculating a first index indicating a temporal variation of the rise for each of the pulses corresponding to one rotation of the wheel assembly;
calculating a frequency spectrum of rotational orders from a first order to an mth order ($m \geq 1$) of the first index by performing frequency analysis on the first index calculated for each of the pulses;
standardizing a gain for each of the rotational orders of the frequency spectrum, using a mean value and a standard deviation of the gain for each rotational order when there is no abnormality; and
calculating a second index for determining whether there is an abnormality, based on the standardized gain.

An abnormality detection method according to another aspect of the present invention is an abnormality detection method executed by a computer for detecting an abnormality that occurs in a wheel assembly attached to an axle includes the following:
sequentially obtaining signals indicating a rotation speed of the wheel assembly, as pulses having a rise;
calculating a first index indicating a temporal variation of the rise for each of the pulses corresponding to one rotation of the wheel assembly;
calculating a frequency spectrum of rotational orders from a first order to an mth order ($m \geq 1$) of the first index by performing frequency analysis on the first index calculated for each of the pulses;
standardizing a gain for each of the rotational orders of the frequency spectrum, using a mean value and a standard deviation of the gain for each rotational order when there is no abnormality; and
calculating a second index for determining whether there is an abnormality, based on the standardized gain.

An abnormality such as wobbling of a wheel assembly or damage to a tire appears in a frequency component of a signal representing the rotation speed of the wheel assembly, even if such an abnormality is so slight that a driver does not notice it. More specifically, due to the above abnormality, a fluctuation having a frequency component that is different from the normal state occurs in a variation in the rising time of a pulse that represents the rotation speed of the wheel assembly. According to the present invention, a gain with respect to the rotational order of the frequency spectrum of this variation is standardized using the mean value and the standard deviation of the gain with respect to the rotational order of the frequency spectrum in the normal state. In this manner, the sensitivity with respect to change in the gain with respect to the rotational order is improved. Since it is determined whether there is an abnormality using the second index calculated based on the above, it is possible to detect an abnormality more appropriately.

BRIEF DESCRIPTION OF THE DRAWINGS

FIG. 8 is a histogram showing the second indices obtained through an experiment conducted by an inventor.

DETAILED DESCRIPTION OF THE PREFERRED EMBODIMENTS

Hereinafter, an abnormality detection apparatus, an abnormality detection program, and an abnormality detection method according to an embodiment of the present invention will be described with reference to the drawings.

1. Overview

Figure 1:
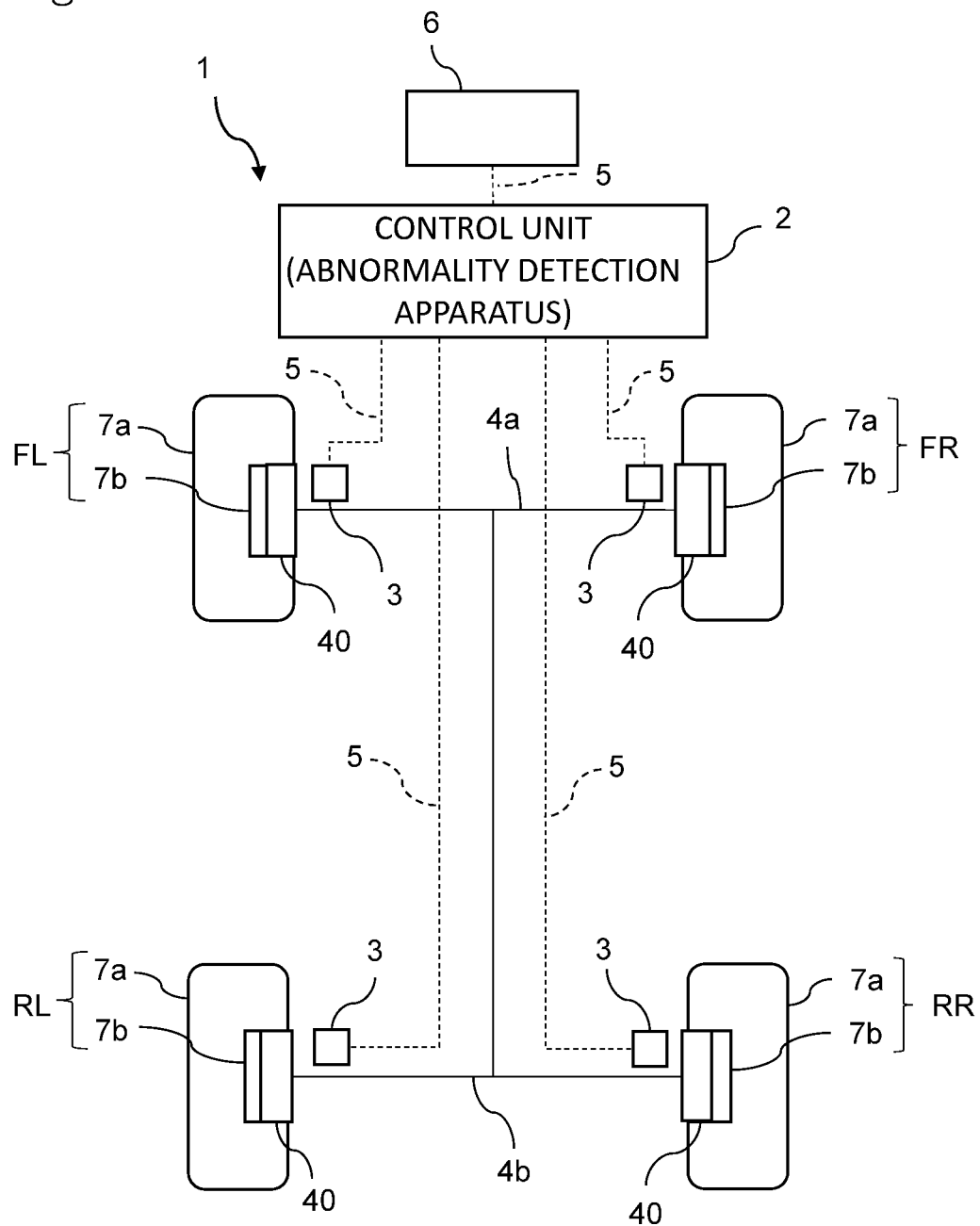
FIG. 1 is a schematic diagram showing a state in which an abnormality detection apparatus according to an embodiment of the present invention is mounted in a vehicle.

FIG. 1 is a schematic diagram showing a state in which an abnormality detection system 1 according to the present embodiment is mounted in a vehicle. The vehicle is a four-wheel vehicle, and includes a left-forward wheel assembly FL, a right-forward wheel assembly FR, a left-rear wheel assembly RL, and a right-rear wheel assembly RR. The vehicle includes a forward axle 4a and a rear axle 4b. The wheel assemblies FL, FR, RL, and RR are respectively attached to hubs 40 fixed at left and right ends of the forward and rear axles 4a and 4b. The wheel assemblies FL, FR, RL, and RR each include a wheel 7b and a tire 7a attached thereto. Each wheel 7b is attached and fixed to the hub 40 through a fixing member (not shown). The fixing member is, typically, a plurality of wheel nuts that each have a screw thread. By the fixing members being engaged with the hub bolts (not shown) on the hubs 40 side and tightened appropriately, the wheel assemblies are respectively fixed to the hubs 40 without loosening.

The abnormality detection system 1 includes a control unit 2 serving as an abnormality detection apparatus, and a sensor unit 3 for detecting information representing the rotation speed of the wheel assemblies FL, FR, RL, and RR. The control unit 2 detects whether there is an abnormality that occurs in at least one of the wheel assemblies FL, FR, RL, and RR, based on signals that are output from the sensor unit 3, and if an abnormality is detected, gives an alarm regarding the abnormality to a driver via a display device 6 included in the vehicle.

Examples of an abnormality that occurs in the wheel assemblies FL, FR, RL, and RR include at least one of wobbling of the wheel assembly or damage to the tire 7a included in the wheel. Examples of the cause of wobbling of the wheel assembly include damage to a hub bolt, damage to a wheel nut, and loosening of the wheel nuts. In particular, loosening of the wheel nuts is a typical cause of wobbling of the wheel assembly. If the wheel 7b is normally fixed to the hub 40, the wheel nuts and the hub bolts are fastened with an appropriate torque without being damaged. If looseness occurs between the wheel nut and the hub bolts, mechanical play occurs between the wheel 7b and the hub 40, which makes the wheel assembly rattle. If the vehicle keeps traveling in this state, the looseness increases due to vibrations applied to the wheel assemblies, and eventually, the wheel nuts may come off from the hub bolts, and the wheel assembly may come off (detach) from the hub 40. For this reason, it is important to discover wobbling of the wheel assembly early and solve the cause of the wobbling.

On the other hand, a pinch-cut that occurs during traveling is a typical damage to the tire 7a. Pinch-cut is a strength member inside the tire 7a being cut due to significant deformation of the tire 7a that is caused by an impact from unevenness of a road surface or an obstacle, and a side wall portion being caught (pinched) between a flange of a wheel rim and the road surface or the obstacle. The strength member is, typically, a carcass cord forming a carcass inside the tire 7a. When a carcass cord is cut, it is not repairable and the tire 7a needs to be replaced. If a serious pinch-cut occurs, a rubber is also cut along with the carcass cord due to the pinching, the pressure of the tire 7a rapidly decreases, which makes the vehicle unable to travel any longer.

On the other hand, in case of a slight pinch-cut, the rubber is not cut, the air pressure is maintained, and thus the driver is unlikely to notice the pinch-cut. However, even in case of a slight pinch-cut, if the vehicle keeps traveling, the tire may suddenly blowout or burst (rupture). Thus, it is necessary to discover the pinch-cut early and replace the tire 7a. In the abnormality detection system 1, regardless of the degree, the detection and alarm of the pinch-cut are possible. However, it is more important to detect a slight pinch-cut that is unlikely to be noticed by a driver, and warn the driver of the fact.

2. Abnormality Detection System

Figure 2:
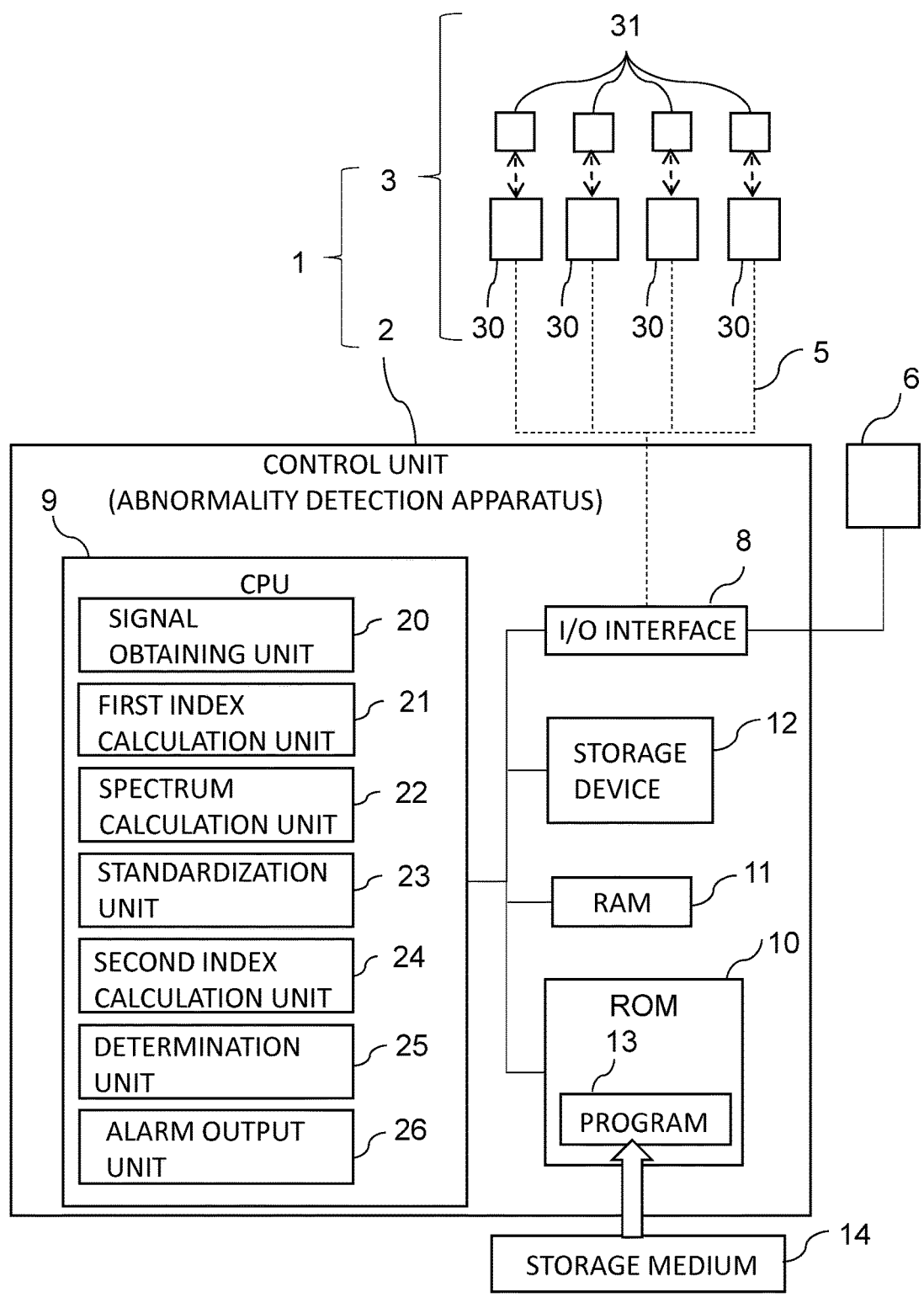
FIG. 2 is a block diagram showing an electrical configuration of the abnormality detection apparatus.

FIG. 2 is a block diagram showing an electrical configuration of the abnormality detection system 1. Hereinafter, the elements of the abnormality detection system 1 will be described.

Control Unit

The control unit 2 is, as hardware, an in-vehicle computer, and includes an I/O interface 8, a CPU (Central Processing Unit) 9, a ROM (Read Only Memory) 10, a RAM (Random Access Memory) 11, and an involatile rewritable storage device 12. The I/O interface 8 is a communication device for communicating with external devices such as the sensor units 3, the display device 6 and the like. A program 13 for controlling the operation of the units of the vehicle is stored in the ROM 10. The program 13 is written from a storage medium 14 such as a CD-ROM into the ROM 10. The CPU 9 virtually operates as a signal obtaining unit 20, a first index calculation unit 21, a spectrum calculation unit 22, a standardization unit 23, a second index calculation unit 24, a determination unit 25, and an alarm output unit 26 by reading out the program 13 from the ROM 10 and executing the program. The details of the operation of the units 20 to 26 will be described later. The storage device 12 is constituted by a hard disk, a flash memory, and the like. Note that, the program 13 may also be stored in the storage device 12 instead of the ROM 10. The RAM 11 and the storage device 12 are used for the calculation performed by the CPU 9 as appropriate.

Sensor Unit

The sensor unit 3 include four rotational bodies 31 that respectively rotate along with the wheel assemblies FL, FR, RL, and RR, and four sensors 30 that continuously detect the physical amount changed by the rotational bodies 31 and output detection signals. The positions where the rotational bodies 31 are to be attached are not limited in particular, as long as they are attached to be rotatable along with the wheel assemblies, around the rotational axes of the wheel assemblies. The sensors 30 are respectively attached to non-rotational portions of the vehicle body that are near the corresponding rotational bodies 31. The sensors 30 are connected to the control unit 2 via communication lines 5.

In the present embodiment, the rotational bodies 31 are gears constituted by magnetic bodies, although they are not limited to this. In the present embodiment, the sensors 30 are magnetic field sensors which each include a permanent magnet and a coil, although they are not limited to this. The sensors 30 are fixed to the vehicle body so as to oppose side circumferential faces of the rotational bodies 31. The magnetic field generated by the permanent magnets of the sensors 30 changes by the rotational bodies 31 rotating and the teeth sequentially pass in front of the sensors 30 and causes a coil to generate inductive power. The waveform of the inductive power is a sine wave whose frequency is proportional to the rotation speed of the rotational bodies 31. The sine wave has cycles of the same number as the number of teeth of the rotational bodies 31, and a single cycle corresponds to a single rotation of a wheel assembly. The sensors 30 output, to the control unit 2, sine wave signals based on the inductive power as signals representing the rotational speeds of the wheel assemblies.

Display Device

The display device 6 can be realized by any form such as a liquid crystal display element, a liquid crystal monitor, a plasma display, and an organic EL (Electro-Luminescence) display, as long as the display device 6 can notify a driver of that there is an abnormality in at least one wheel assembly. For example, the display device 6 can be formed by four lamps that respectively correspond to the wheel assemblies FL, FR, RL, and RR being arranged to conform to the actual arrangement of the wheel assemblies. The position where the display device 6 is attached may be selected as appropriate, but the display device 6 is preferably provided at a position that is easy for the driver to recognize, such as on an instrumental panel. If the control unit 2 is connected to a car navigation system, a monitor for car navigation may be used as the display device 6. The alarm can be output through the display device 6 in a form such as an icon or textual information. Additionally, the alarm may also be output in a form such as audio or an alarm sound, via a speaker mounted in the vehicle.

3. Abnormality Detection Processing

Figure 3:
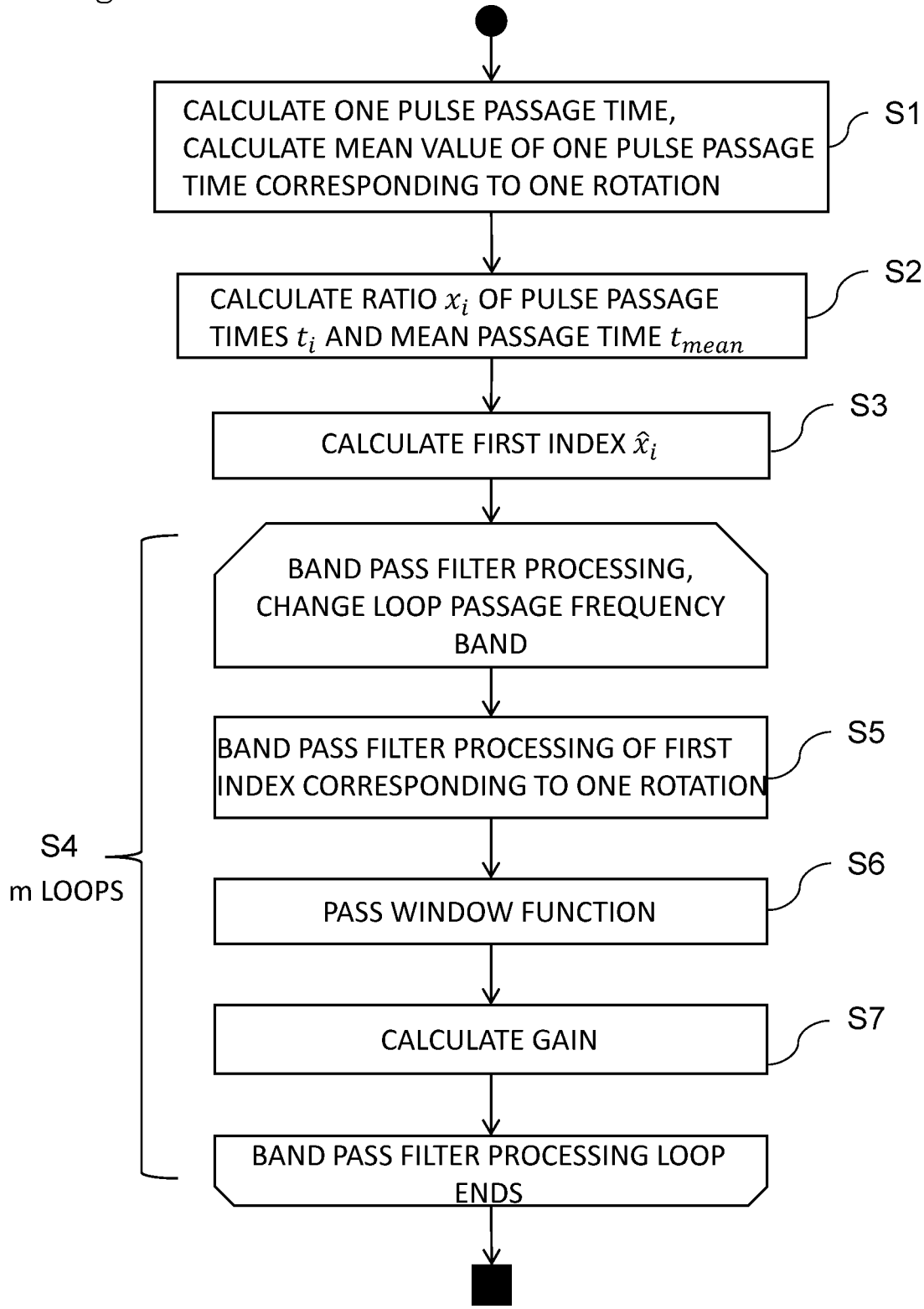
FIG. 3 is a flowchart showing a flow of abnormality detection processing.
Figure 4:
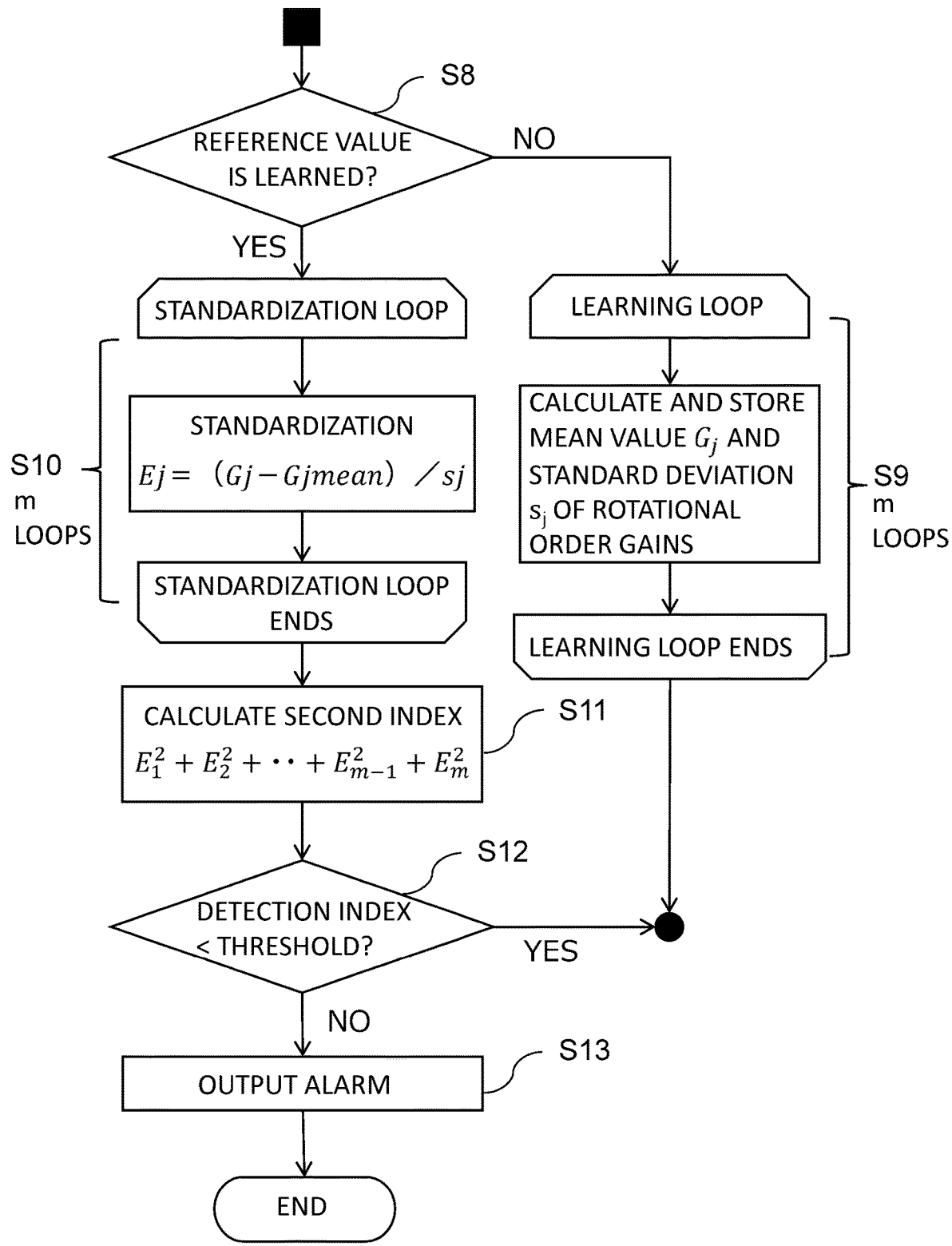
FIG. 4 is a flowchart showing a flow of abnormality detection processing.

Hereinafter, the abnormality detection method for detecting an abnormality in the wheel assemblies FL, FR, RL, and RR executed by the abnormality detection system 1 according to the present embodiment will be described. FIGS. 3 and 4 are flowcharts showing a flow of abnormality detection processing. The following abnormality detection processing is divided into a learning phase in which a reference value for determining whether there is an abnormality based on the signals from the sensors 30 is calculated, and the reference value is stored in the storage device 12 of the control unit 2, and an abnormality detection phase in which the control unit 2 determines whether there is an abnormality based on the signals from the sensors 30 and the reference value.

The learning phase is performed when an initialization switch of the vehicle is operated by the driver, for example, and repeatedly executed for a period until a predetermined time period elapses or while the vehicle travels in a predetermined distance. The processing in the learning phase can be started at a timing when it is assumed that the vehicle is normal and there is no abnormality in any of the wheel assemblies, such as after maintenance and inspection of the vehicle is performed, or when a new car is obtained, or when the tires have been replaced. When the learning phase has been completed, the vehicle transitions to the abnormality detection phase. In the abnormality detection phase, processing for determining whether there is an abnormality in the wheel assemblies during traveling is repeatedly executed. Hereinafter, the steps will be described.

Figure 5A:
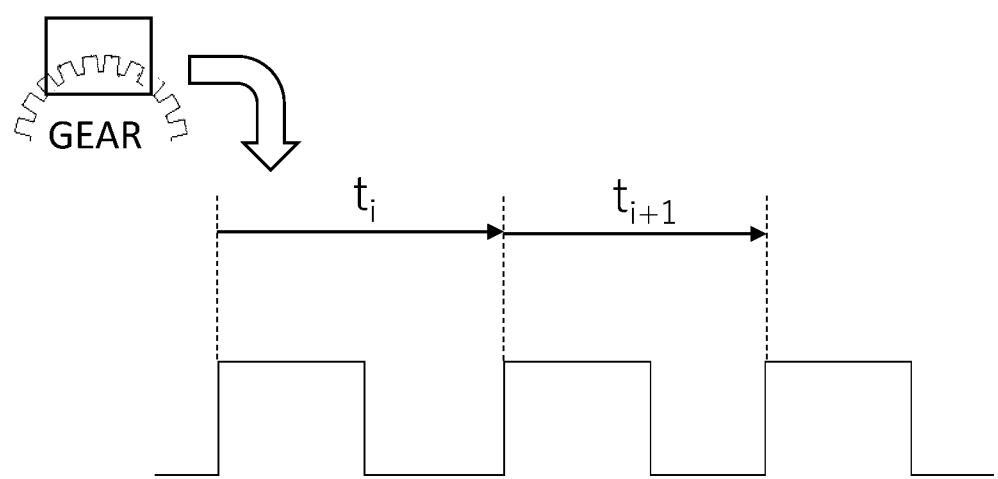
FIG. 5A is a diagram illustrating a pulse obtained from a rotation speed sensor in a normal state.

In step S1 in FIG. 3, the signal obtaining unit 20 sequentially obtains the sine-wave signal that is output from the sensor 30 of each wheel assembly, as a pulse having a rise. The signal obtaining unit 20 samples the sine-wave signals in a predetermined period to convert the signals into pulses such as shown in FIG. 5A, and calculates a passage time t for each pulse. The passage time t corresponds to a time period in which a tooth (i) having the tooth number i of the rotational body 31 passes in front of the sensor 30. The passage time $t_i$ can be measured based on a signal referred to as a "time stamp" that is supplied from a clock module mounted in the sensor 30, for example.

Here, the pitch of the gear of each rotational body 31 is not completely uniform, and the respective passage times $t_i$ during which the rotational body 31 rotates a single rotation varies corresponding to the pitches between the teeth (see FIG. 5A). In step S2, the first index calculation unit 21 calculates a comparison value $x_i$ for comparing each of the passage times $t_i$ (i=1, 2, . . . , N) of the pulses corresponding to the number N of teeth corresponding to a single rotation of the wheel assembly with these mean passage time $t_{mean}$, according to the following expression.

$$x_i = t_i/t_{mean} - 1$$

Next, in step S3, the first index calculation unit 21 estimates Expression 1 that is a signal representing a comparison value $x_i$ for a single rotation of the wheel assembly (hereinafter, the signal is also referred to as "x-hat$_i$(k)").

$$\hat{x}_i(k) \qquad \text{[Expression 1]}$$

This can also be said to be a step for reducing noise included in the comparison value $x_i$ and modeling the comparison value $x_i$, and the estimation method is not limited in particular, but the estimation can be performed through feedback processing according to the following expression.

$$\hat{x}_i(k) = \hat{x}_i(k-1) + \sigma\{x_i(k-1) - \hat{x}_i(k-1)\} \qquad \text{[Expression 2]}$$

Here, "i" denotes a tooth number, "$\hat{x}_i(k-1)$" denotes an estimation value of "$x_i(k-1)$" one clock ago, and "$\sigma$" denotes an observer gain.

The estimated x-hat$_i$ (k) is a correction coefficient for correcting the variation of the passage time $t_i$ regarding the teeth (i). In the state where there is no abnormality in the wheel assemblies, x-hat$_i$(k) is a signal including the frequency component corresponding to the pitch of each tooth. In other words, the x-hat$_i$(k) that is estimated as above is an example of the first index representing a temporal variation of the rises of pulses corresponding to a single revolution of the wheel assembly, that are sequentially obtained by the signal obtaining unit 20. Note that, the first index is not limited to this, as long as it is an index representing the temporal variation of the rises of the pulses corresponding to a single revolution of the wheel assembly.

Step S4 is a step including a loop of steps S5 to S7. In step S4, the spectrum calculation unit 22 derives the frequency spectrum of the x-hat$_i$ (k) that is estimated through frequency analysis, and repeats steps S5 to S7 for calculating gains based on this with respect to rotational orders from the first order to an mth order. In this manner, in step S4, the gains of the frequency spectrum of rotational orders from a first order to an mth order are calculated. Hereinafter, processing executed in steps S5 to S7 will be described, taking the first loop as an example.

In the first loop, analyze is performed on the first rotational order component, in other words, the component for completing one cycle corresponding to a single revolution of the wheel assembly. The spectrum calculation unit 22, first, passes the x-hat$_i$ (k) corresponding to a single revolution of the wheel assembly through a band pass filter to extract the component near the first rotational order (step S5).

In step S6, the spectrum calculation unit 22 applies a window function to the rotational order component extracted in step S5. This processing is for cutting out a finite section prior to calculation of the gain in the next step S7. The window function to be applied is not limited in particular, and a known window function such as the Hanning window and the Hamming window can be applied. From a viewpoint that the attenuation of a side lobe is quick, the Blackman window function is preferable.

In step S7, the spectrum calculation unit 22 calculates the gain of the first rotational order regarding a signal obtained by multiplying the window function in step S6. The spectrum calculation unit 22 specifies the gain regarding the first rotational order from the temporal axis signal, based on Parseval's theorem. Here, the first loop ends and a second loop starts.

In the second loop, analyze is performed on the secondary rotational order component, i.e., the component for completing two cycles corresponding to a single revolution of the wheel assembly. The spectrum calculation unit 22 changes the frequency band of the band pass filter in step S5, and sets the band pass filter whose frequency band has been changed as a band pass filter through which the frequency band around the secondary rotational order component is passed. In other words, in step S5 in the second loop, the component around the secondary rotational order is extracted from x-hat$_i$ (k) that corresponds to a single revolution of the wheel assembly that is estimated in step S3. Thereafter, steps S6 and S7 are executed in a similar manner to the first loop.

As described above, the spectrum calculation unit 22 repeats steps S5 to S7 on the component that has completed jth cycles corresponding to a single revolution of the wheel assembly, while changing the passage frequency band of the band pass filter every time the loop count increases by 1. In this manner, when the loop in step S4 is completed, gains $G_j$ (j=1, 2, . . . , m) with respect to rotational orders from the first order to an mth order are calculated. The spectrum calculation unit 22 stores the calculated gains $G_j$ in the RAM 11 or the storage device 12. The processing of steps S1 to S7 is repeated on the signals corresponding to a single revolution of the wheel assemblies that are sequentially obtained by the signal obtaining unit 20. In other words, every time the signals corresponding to a single revolution of the wheel assemblies are sequentially input, the gains $G_j$ (j=1, 2, . . . , m) are sequentially calculated.

Here, the maximum order m for the rotational order analysis is not limited in particular, and can be an integer of 1 or more. From a viewpoint of improving the reliability of abnormality detection, m is preferably 10 or more. In the present embodiment, m=20.

With reference to FIG. 4, in the next step S8, whether the reference values for calculating the second index for determining whether there is an abnormality are already specified and stored in the storage device 12 (whether the reference values are learned) is determined by the standardization unit 23 (the second index will be described later). The reference values in the present embodiment are a mean value $G_{jmean}$ and a standard deviation $s_j$ of the rotational orders of the gains $G_j$ calculated in step S4. If the reference values are not specified yet (NO), the processing transitions to a learning loop in step S9. On the other hand, if the reference values are already specified (YES), the processing transitions to a standardization loop in step S10. In other words, steps S1 to S9 correspond to the above-described learning phase, and steps S1 to S13 correspond to the above-described abnormality detection phase.

In step S9, the standardization unit 23 calculates, the mean value $G_{jmean}$ and the standard deviation $s_j$ of the gain G for each rotational order of the gains $G_j$ that are sequentially calculated in step S4, and stores the calculated values in the storage device 12. In other words, in the learning loop in step S9, the processing for calculating and storing the mean value $G_{jmean}$ and the standard deviation $s_j$ of the gains $G_j$ calculated in step S4 heretofore is repeated for rotational orders from the first order to an mth order. When step S9 ends, again, the loops of steps S1 to S3 and steps S5 to S7 are repeated m times, and thereafter, the loop of step S9 is executed again for m times, and the mean value $G_{jmean}$ and the standard deviation $s_j$ stored in the storage device 12 are updated. When the m-time loops of steps S1 to S3, and the m-time loops of steps S5 to S7, and the m-time loops of step S9 are repeated a predetermined number of times or for a predetermined traveling distance, the learning phase ends and transitions to the abnormality detection phase. In the abnormality detection phase, after executing the m-time loops of steps S1 to S3 and steps S5 to S7, step S10 is executed.

In step S10, the standardization unit 23 calculates a value $E_j$ obtained by standardizing the gains $G_j$ obtained in step S4 using the mean value $G_{jmean}$ and the standard deviation $s_j$ stored in the storage device 12. This processing can be executed according to the following expression.

$$E_j=(G_j-G_{jmean})/s_j$$

In step S11, the second index calculation unit 24 calculates the second index Y for determining whether there is an abnormality, according to the following expression.

$$Y=E_1^2+E_2^2 \ldots +E_{m-1}^2+E_m^2 \qquad \text{[Expression 3]}$$

Figure 5B:
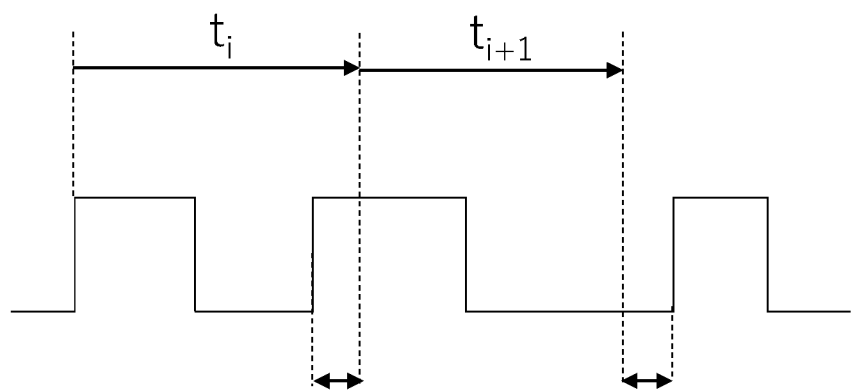
FIG. 5B is diagram illustrating a pulse obtained from the rotation speed sensor in an abnormal state.

Here, the reason why it is possible to determine whether there is an abnormality using the second index Y will be described. As described above, in the signals representing the rotation speed of the wheel assembly, as shown in FIG. 5A, there is a variation in the passage time $t_i$ due to a pitch unique to each tooth (i) of the rotational body 31. On the other hand, when there is an abnormality in the wheel assembly, as shown in FIG. 5B, the variation in the passage time $t_i$ increases. The reason for this is conceivably that the weight balance of the wheel assembly with respect to the rotational axis is lost due to wobbling of the wheel assembly or a pinch-cut, and the vibration mode changes from the normal state. Note that, it is conceivable, with respect to the rotation signal detected by the sensors 30, to perform processing for correcting slight error components such as variation in manufacture that is overlaid on the rotation signal of this sensors 30. However, if such processing is included, the components of the weight balance are also corrected, and the components due to the wobbling or pinch-cut of the wheel assemblies may be also corrected. For this reason, it is preferable to not perform processing for correcting slight error component such as variation in manufacture that is superimposed on the rotation signal.

Figure 6A:
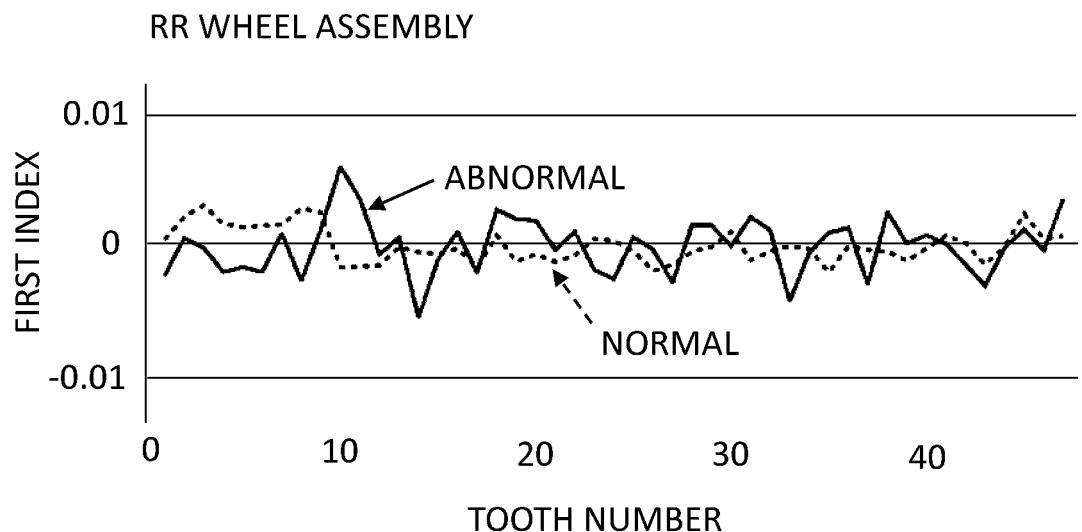
FIG. 6A is a graph showing first indices with respect to tooth numbers (RR wheel).
Figure 6B:
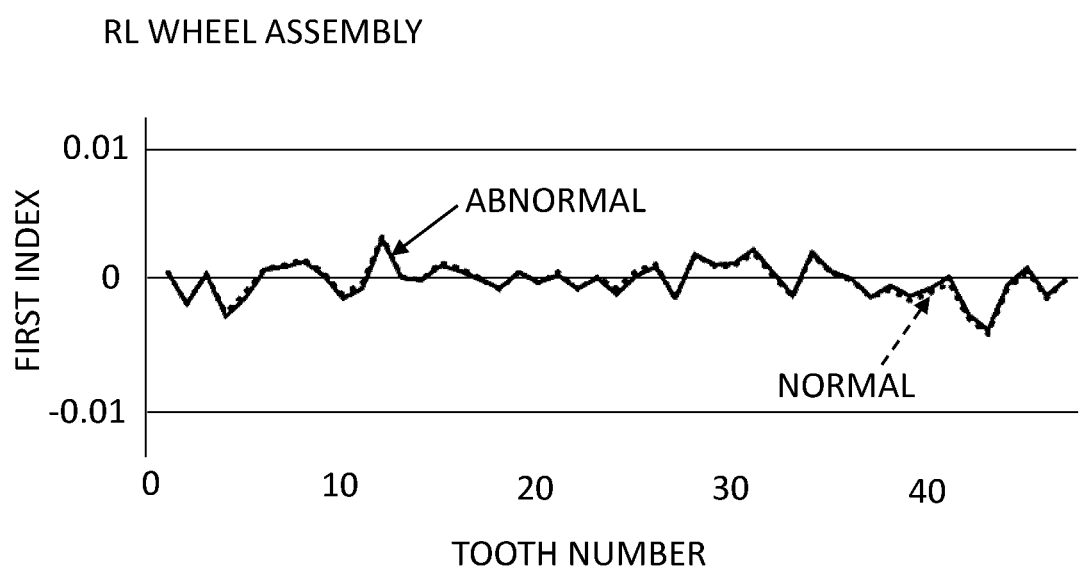
FIG. 6B is a graph showing first indices with respect to tooth numbers (RL wheel).

FIGS. 6A and 6B are graphs with which the fact that the vibration mode changes due to the wobbling or pinch-cut of the wheel assembly is confirmed through an experiment. In the experiment, wheel assemblies having tires with a normal air pressure (205/60R16, TOYO TRAMPATH J62) were attached to a vehicle (Honda Jade). The vehicle traveled along a test course (Sumitomo Rubber Industries, Ltd. Okayama test course, circuit track) at 35 to 45 km/h both in a case where there was no abnormality in the wheel assemblies (normal), and a case where all of wheel nuts of one wheel assembly were loosened (abnormality). The abnormality of the wheel assembly was made by loosening all the wheel nuts of the RR wheel assembly and making them protrude outward by 1 mm compared with the normal state. In FIGS. 6A and 6B, the first indices are plotted with respect to the tooth numbers in these cases. FIG. 6A is a graph regarding the RR wheel assembly, and FIG. 6B is a graph regarding the RL wheel assembly. In FIG. 6A, i.e., in the example of the RR wheel assembly, it is confirmed that the width of the first indices is vertically widened in the abnormal state, and in the abnormal state, on the whole, the variation in the passage time $t_i$ is greater. On the other hand, in FIG. 6B, i.e., in the example of the RL wheel assembly, the first indices hardly change between the normal state (dot line) and the abnormal state (solid line), and it can be confirmed that a prominent change in the first indices occurs in the wheel assembly where there is an abnormality.

Figure 7A:
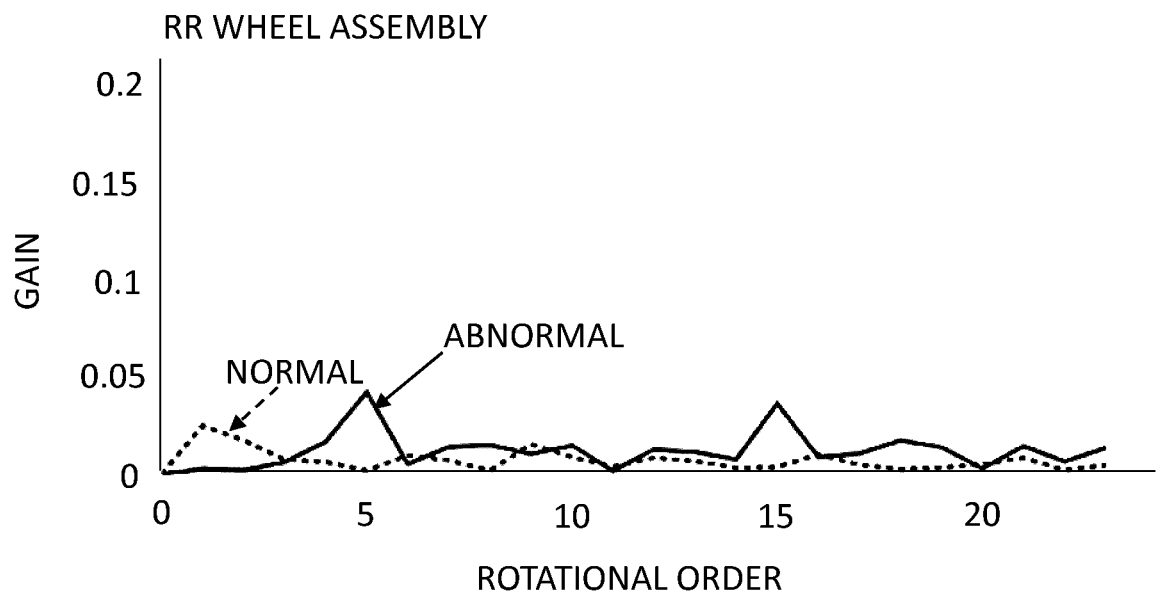
FIG. 7A shows the respective gains of frequency spectra of rotational orders of the first indices in a normal state and in an abnormal state (RR wheel assembly).
Figure 7B:
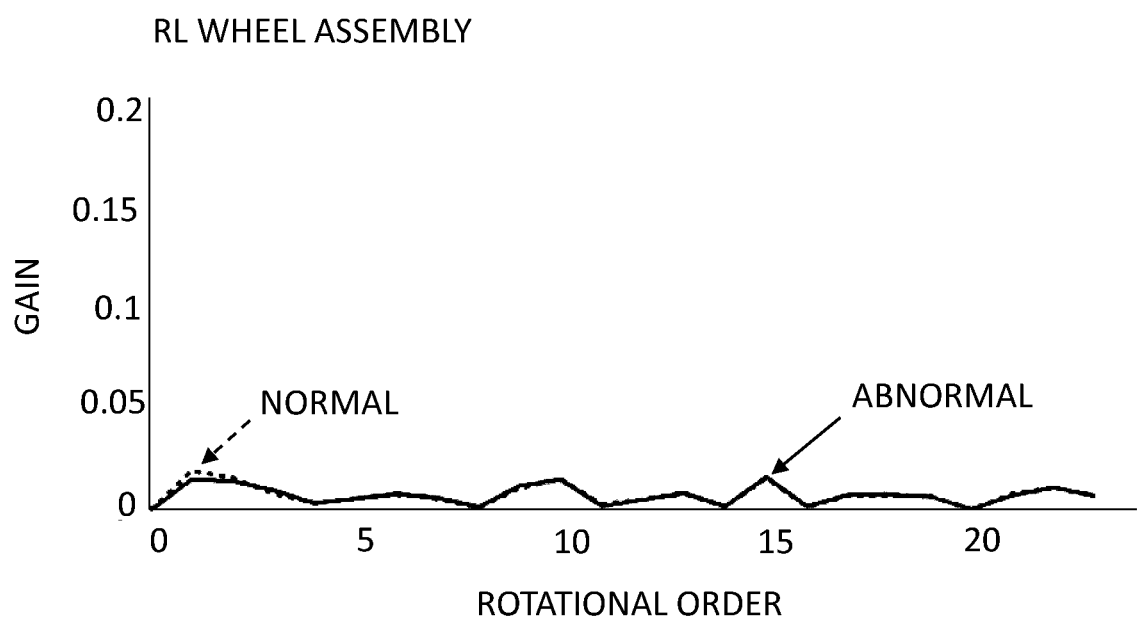
FIG. 7B shows the respective gains of frequency spectra of rotational orders of the first indices in a normal state and in an abnormal state (RL wheel assembly).

FIGS. 7A and 7B are graphs regarding gains with respect to rotational orders (here, m=24) of a result of performing the rotational order analysis on the first indices in FIGS. 6A and 6B, where the dotted line represents the gains in the normal state and the solid line represents the gains in the abnormal state. In the example shown in FIG. 7A (RR wheel assembly), it is confirmed that, depending on the rotational order, the gain decreases more in the abnormal state than in the normal state, or the gain hardly changes in both states, and the change amounts of the gain with respect to the rotational order are various. For this reason, through the method of comparing the gain value itself with the threshold value, the normal state and the abnormal state may not be appropriately distinguished from each other. On the other hand, in the example of FIG. 7B (RL wheel assembly), it was confirmed that the tendency of the gains hardly changes both in the normal state and the abnormal state.

However, as described above, if the gains $G_j$ with respect to the rotational order are standardized based on the mean value $G_{jmean}$ and the standard deviation $s_j$, the gain for each rotational order can be handled as data that follows a normal distribution in which the mean is 0 and the standard deviation is 1. In this manner, the weights between the rotation orders are aligned, which makes it possible to evaluate the change in gain for each rotational order using the same scale.

More specifically, if the mean value $G_{jmean}$ and the standard deviation $s_j$ obtained in the learning phase are set as the reference values, and the gains $G_j$ newly obtained when there is no abnormality in the wheel assemblies are standardized based on the reference value, the standardized gains $E_j$ of the orders can be assumed to follow a normal distribution in which the mean is 0 and the standard deviation is 1, similarly to the reference value data. The second index Y, which is the square sum of gain $E_j$, can be assumed to follow an $\chi$ square distribution with the degree of freedom m.

On the other hand, if there is an abnormality in the wheel assembly and the newly obtained gains $G_j$ are standardized based on the reference values, it is highly possible that the standardized gains $E_j$ of the orders deviate from the center of the above-described normal distribution. For this reason, the probability of occurrence of the second index Y is of a significantly low value. Accordingly, if a significance level in the $\chi$ square distribution with the degree of freedom m is set in advance, an alarm threshold of the second index Y for determining whether there is an abnormality is also automatically set. In the present embodiment, the determination unit 25 sets the alarm threshold in advance based on the significance level and the degree of freedom that are predetermined.

Referring to FIG. 4 again, in step S12, the determination unit 25 compares the second index Y calculated in step S11 with the alarm threshold to determine whether there is an abnormality. This determination is performed for each of the wheel assemblies FL, FR, RL, and RR. If the second indices Y of all the wheel assemblies are less than the threshold (YES), the determination unit 25 determines that there is no abnormality in any wheel assembly. In this case, the processing returns to step S1. On the other hand, if there is one or plurality of second indices Y that are the threshold or more (NO), the determination unit 25 determines that there is an abnormality in one of the wheel assemblies. In this case, the processing advances to step S13.

In step S13, the alarm output unit 26 outputs the alarm via the display device 6. At this time, the display device 6 may also output an alarm specifying the wheel assembly where there is an abnormality, or output an alarm so as to indicate only the fact that there is an abnormality in one of the wheel assemblies. The alarm may include content indicating a specific countermeasure for the abnormality of the wheel assembly that has conceivably occurred, such as urging the driver to perform an inspection of the wheel nut or replace the tire 7a.

4. Features

With the abnormality detection system 1 according to the above-described embodiment, since the gain for each rotational order when there is no abnormality is standardized, there is no need for setting the threshold for each rotational order, and the abnormality detection system 1 can be simple and can also be applied to any vehicle, wheel assembly, in particular, regardless of the type of the tire. Also, even if the gain has changed to decrease, or the change in the gain is small, such a change can be recognized, and this makes it possible to detect an abnormality with a higher accuracy than the case where it is determined there is an abnormality if the gain merely exceeds the threshold value and the case where it is determined that there is an abnormality if the total value of all the rotational order of the gains exceeds the threshold value.

With the abnormality detection system 1 according to the above embodiment, whether there is an abnormality is determined based on the second index Y, which is a square cumulative sum of the standardized gains $E_j$. The distribution of the second indices Y when there is no abnormality in the wheel assemblies follows an $\chi$ square distribution with the degrees of freedom m. In this manner, it is possible to determine the threshold for determining whether there is an abnormality from a probability density function that depends on the degree of freedom, and thus there is no need to set the threshold by performing experiments under the conditions of various vehicles and wheel assemblies, which makes the abnormality detection system 1 simple.

5. Variations

Although an embodiment of the present invention has been described above, the present invention is not limited to the above embodiment, and various changes can be made without departing from the gist of the invention. For example, variations such as below can be applied. Note that the gists of following variations can be combined as appropriate.

(1) Although the vehicle of the above embodiment has four wheel assemblies, the number of wheel assemblies is not limited in particular, and may also be less than four and five or more. The type of the vehicle in which the abnormality detection system 1 according to the above embodiment is mounted is not limited in particular, and may also be a passenger automobile, a commercial car, or the like.

(2) In the above-described embodiment, the sensor unit 3 is an electromagnetic pickup sensor unit that includes gears, permanent magnets, and coils. However, the sensor unit 3 is not limited in particular as long as it can detect the physical amount that changes in accordance with the rotation speed of the wheel assemblies. For example, the rotational bodies 31 may also be permanent magnets in which the north poles and south poles are alternately arranged in an annular manner at a predetermined pitch, and the sensors 30 may also be Hall element sensors, MR (Magneto Resistive) sensors, MI (Magneto Impedance) sensors, or the like, that detect the magnetic field. Further, for example, the sensor unit 3 may also be an optical sensor unit that detects light as the physical amount. In this case, each sensor unit 3 may also include a light emitting element, sensors 30 serving as a light receiving element, and disc-like rotational bodies 31 in which slits are formed at a predetermined pitch in a circumferential direction.

(3) In the above embodiment, the signals indicating the rotation speed were converted into the pulses having a rise on the control unit 2 side. However, a configuration is also possible in which the sensor unit 3 outputs the pulses having a rise, and the signal obtaining unit 20 of the control unit 2 obtains the pulses.

(4) The abnormality detection processing in the above embodiment is merely an example and may be modified as appropriate. For example, steps S3 and S6 may also be omitted. In the case where step S3 is omitted, the comparison value $x_j$ may be set as the first index.

(5) The second index Y is not limited to the sum of squares (square sum) of $E_j$ as in the above embodiment, and may also be the total sum of the absolute values of $E_j$. That is, the second index Y may also be calculated as at least one of the total and the square sum of the absolute values.

EXAMPLES

Hereinafter, examples of the present invention will be described. However, the following examples are merely examples, and the present invention is not limited to these examples.

Experiment 1

Wheels to which tires with an appropriate size and normal air pressure (205/60R16, TOYO TRAMPATH J62) were attached to the axles of a vehicle (Honda Jade), and the vehicle traveled at 35 to 45 km/h along a test course (Sumitomo Rubber Industries, Ltd. Okayama Test Course, circuit track). The abnormality detection method according to the above embodiment was performed under various conditions to check the distribution of the second indices. The conditions were as follows.

Condition 1: A normal state in which there is no abnormality in all the wheel assemblies Condition 2: A state in which all the wheel nuts of the RR wheel assembly are loosened and protrude outward by 1 mm relative to the normal state A histogram of the second indices calculated under the conditions 1 and 2 is as shown in FIG. 8. The horizontal axis of FIG. 8 represents the value of the second index divided every 10 levels, and the vertical axis represents the frequency of occurrence of each level. As shown in FIG. 8, it was confirmed that, on both sides of the alarm threshold (t value=49.5 with the degree of freedom of 20, and the significant reference of 0.01%), the distribution of the second indices on condition 1 (bars with diagonal lines) and the second indices on condition 2 (solid bars) are clearly separate from each other. In this manner, it was confirmed that the loosening of the wheel nut can be detected through the above-described abnormality detection method.

Experiment 2

Figure 9A:
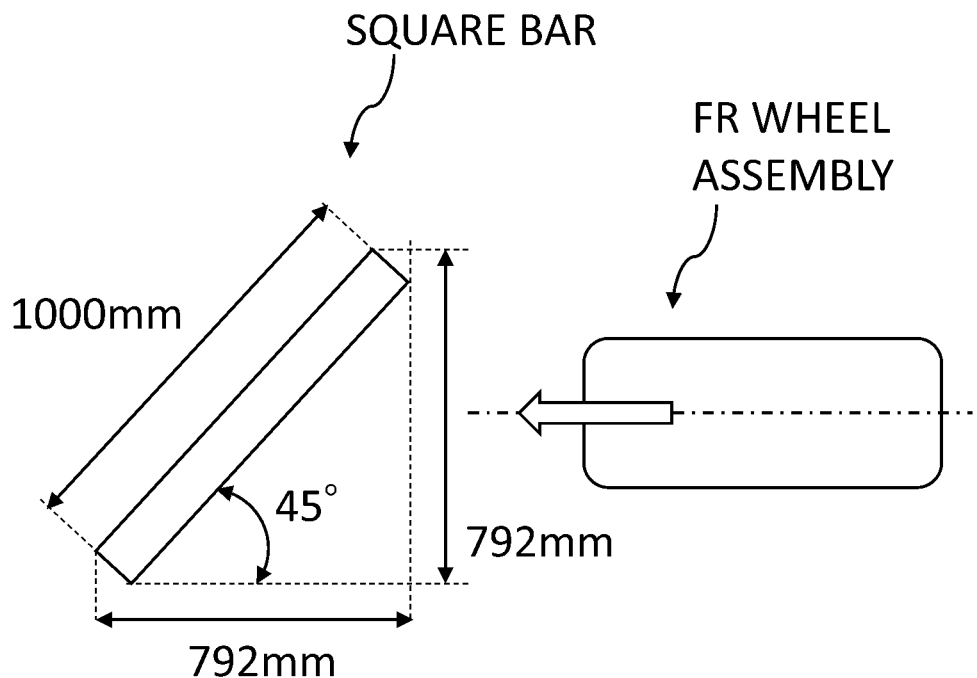
FIG. 9A is a diagram illustrating how the experiment was conducted by the inventor.
Figure 9B:
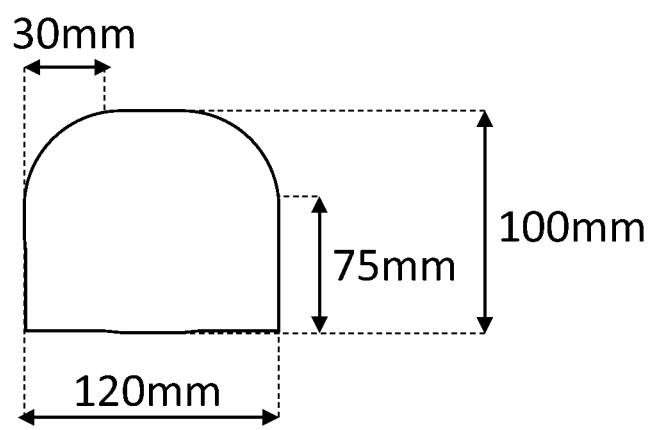
FIG. 9B is a cross sectional view of a square bar used in the experiment conducted by the inventor.

Wheels to which tires with a normal air pressure (CONTINENTAL CrossContact LX Sport) were attached to the axles of a vehicle (PSA sedan 5008, four-wheel vehicle) in a state where there is no loosening of the wheel nuts. The vehicle traveled along a test course (China, CATARC). As shown in FIG. 9A, a square bar having the length of 1 m, width of 12 cm, and height of 10 cm was disposed on the test course such that the angle of the bar with respect to the traveling direction of the vehicle was 45°. The cross-sectional view of the square bar is as shown in FIG. 9B. The FR wheel assembly was made to collide with the square bar while the vehicle is traveling at about 50 km/h, and a pinch-cut was generated in the tire, and the second indices of the FR and FL wheel assemblies at that time were calculated.

Figure 10:
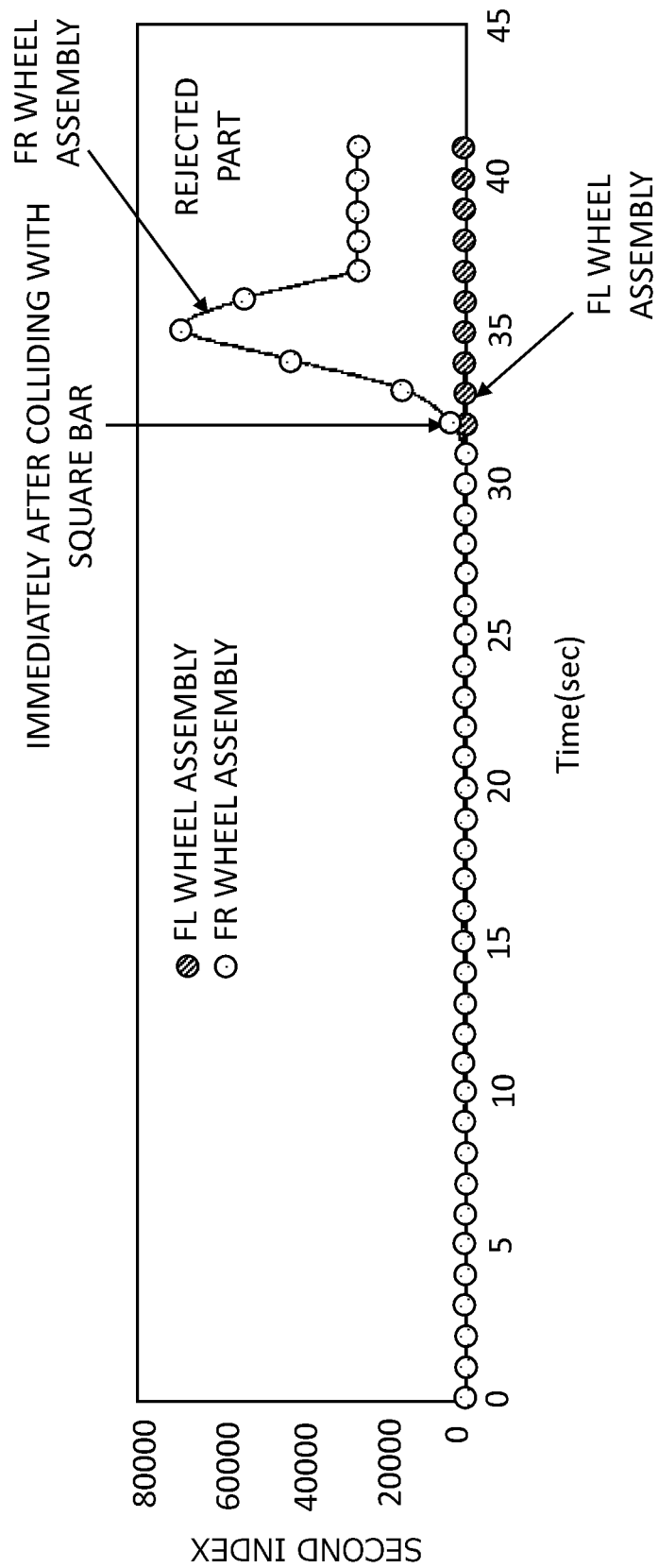
FIG. 10 is a graph showing the second indices regarding an FR wheel assembly and an FL wheel assembly with respect to time.

The calculated second indices were as shown in FIG. 10. From 32 to 36 seconds, which was considered to be the time immediately after the collision of the FR wheel assembly with the square bar, only the second index of the FR wheel assembly prominently increased (Note that the data on and after 36 second was rejected and not used for calculation of the second indices). In this manner, it was confirmed that the fact that a pinch-cut was generated in the tire could be detected through the above-described abnormality detection method.

LIST OF REFERENCE NUMERALS

| | | | |
|---|---|---|---|
| 1 | Abnormality detection system | | |
| 2 | Control unit (abnormality detection apparatus) | | |
| 3 | Sensor unit | 4a | Front axle |
| 4b | Rear axle | 5 | Communication line |
| 6 | Display device | 13 | Program |
| 20 | Signal degree obtaining unit | | |
| 21 | First index calculation unit | | |
| 22 | Spectrum calculation unit | | |
| 23 | Standardization unit | | |
| 24 | Second index calculation unit | | |
| 25 | Determination unit | | |
| 26 | Alarm output unit | | |
| FL | Left front wheel assembly | | |
| FR | Right front wheel assembly | | |
| RL | Left rear wheel assembly | | |
| RR | Right rear wheel assembly | | |

What is claimed is:

1. An abnormality detection apparatus for detecting an abnormality that occurs in a wheel assembly, the abnormality detection apparatus comprising:

a sensing system including:

rotational bodies each rotating along with a corresponding one of wheel assemblies; and sensors each continuously detecting a physical amount changed by a corresponding one of the rotational bodies;

a computer including an I/O interface and a CPU, each sensor being connected to the CPU via a communication line and the I/O interface, the physical amounts detected by each sensor being transmitted to the computer in real time, the CPU of the computer being programmed to function as:

a signal obtaining unit configured to sequentially obtain signals from the sensing system indicating a rotation speed of the wheel assembly, as pulses having a rise;

a first index calculation unit configured to calculate a first index indicating a temporal variation of the rise for each of the pulses corresponding to one rotation of the wheel assembly;

a spectrum calculation unit configured to calculate a frequency spectrum of rotational orders from a first order to an mth order (m≥1) of the first index by performing frequency analysis on the first index calculated for each of the pulses;

a standardization unit configured to standardize a gain for each of the rotational orders of the frequency spectrum, using a mean value and a standard deviation of the gain for each rotational order when there is no abnormality; and a second index calculation unit configured to calculate a second index for determining whether there is an abnormality, based on the standardized gain; and a display device, configured to output an alarm in response to a determination that there is abnormality, based on the standardized gain, wherein the computer is configured to make the determination with increased sensitivity to changes in a frequency spectrum and using an alarm threshold automatically derived from a statistical distribution based on a pre-defined significance level, without setting empirical thresholds for each rotational order.

2. The abnormality detection apparatus according to claim 1,
wherein the abnormality is a pinch-cut that occurs in a tire included in the wheel assembly.

3. The abnormality detection apparatus according to claim 2,
wherein the abnormality is loosening of a fixing member for attaching and fixing a wheel included in the wheel assembly to an axle.

4. The abnormality detection apparatus according to claim 2,
wherein the second index is calculated using at least one of a sum and a square sum of absolute values from a first order to an mth order of the standardized gains.

5. The abnormality detection apparatus according to claim 2, further comprising:
a determination unit configured to determine whether there is an abnormality, based on the calculated second index.

6. The abnormality detection apparatus according to claim 5,
wherein the determination unit sets a threshold for determining whether there is an abnormality, based on a probability distribution that the second index follows if there is no abnormality.

7. The abnormality detection apparatus according to claim 1,
wherein the abnormality is loosening of a fixing member for attaching and fixing a wheel included in the wheel assembly to an axle.

8. The abnormality detection apparatus according to claim 7,
wherein the second index is calculated using at least one of a sum and a square sum of absolute values from a first order to an mth order of the standardized gains.

9. The abnormality detection apparatus according to claim 7, further comprising:
a determination unit configured to determine whether there is an abnormality, based on the calculated second index.

10. The abnormality detection apparatus according to claim 9,
wherein the determination unit sets a threshold for determining whether there is an abnormality, based on a probability distribution that the second index follows if there is no abnormality.

11. The abnormality detection apparatus according to claim 1,
wherein the second index is calculated using at least one of a sum and a square sum of absolute values from a first order to an mth order of the standardized gains.

12. The abnormality detection apparatus according to claim 11, further comprising:
a determination unit configured to determine whether there is an abnormality, based on the calculated second index.

13. The abnormality detection apparatus according to claim 12,
wherein the determination unit sets a threshold for determining whether there is an abnormality, based on a probability distribution that the second index follows if there is no abnormality.

14. The abnormality detection apparatus according to claim 1, further comprising:
a determination unit configured to determine whether there is an abnormality, based on the calculated second index.

15. The abnormality detection apparatus according to claim 14,
wherein the determination unit sets a threshold for determining whether there is an abnormality, based on a probability distribution that the second index follows if there is no abnormality.

16. The abnormality detection apparatus according to claim 1,
wherein the signal representing the rotation speed of the wheel assembly is a signal that is output from a rotation speed sensor mounted in a vehicle, and
the rotation speed sensor detects at least one of magnetic field and light that change in accordance with the rotation of the wheel assembly.

17. A non-transitory computer-readable medium recording an abnormality detection program for detecting an abnormality that occurs in a wheel assembly attached to an axle, the program causing a computer to execute:
controlling a sensing system, the sensing system including:
rotational bodies each rotating along with a corresponding one of wheel assemblies; and
sensors each continuously detecting a physical amount changed by a corresponding one of the rotational bodies, wherein the computer includes an I/O interface and a CPU, each sensor being connected to the CPU via a communication line and the I/O interface, the physical amounts detected by each sensor being transmitted to the computer in real time;
sequentially obtaining signals from the sensing system indicating a rotation speed of the wheel assembly, as pulses having a rise;
calculating a first index indicating a temporal variation of the rise for each of the pulses corresponding to one rotation of the wheel assembly;
calculating a frequency spectrum of rotational orders from a first order to an mth order (m≥1) of the first index by performing frequency analysis on the first index calculated for each of the pulses;
standardizing a gain for each of the rotational orders of the frequency spectrum, using a mean value and a standard deviation of the gain for each rotational order when there is no abnormality;
calculating a second index for determining whether there is an abnormality, based on the standardized gain; and
controlling a display device to output an alarm in response to a determination that there is abnormality, based on the standardized gain, wherein the computer is configured to make the determination with increased sensitivity to changes in a frequency spectrum and using an alarm threshold automatically derived from a statistical distribution based on a pre-defined significance level, without setting empirical thresholds for each rotational order.

18. An abnormality detection method, executed by a computer for detecting an abnormality that occurs in a wheel assembly attached to an axle, the method comprising:
operating a sensing system, the sensing system including:
rotational bodies each rotating along with a corresponding one of wheel assemblies; and
sensors each continuously detecting a physical amount changed by a corresponding one of the rotational bodies, wherein the computer includes an I/O interface and a CPU, each sensor being connected to the CPU via a communication line and the I/O interface, the physical amounts detected by each sensor being transmitted to the computer in real time;
sequentially obtaining signals from the sensing system indicating a rotation speed of the wheel assembly, as pulses having a rise;
calculating a first index indicating a temporal variation of the rise for each of the pulses corresponding to one rotation of the wheel assembly;
calculating a frequency spectrum of rotational orders from a first order to an mth order ($m \geq 1$) of the first index by performing frequency analysis on the first index calculated for each of the pulses;
standardizing a gain for each of the rotational orders of the frequency spectrum, using a mean value and a standard deviation of the gain for each rotational order when there is no abnormality;
calculating a second index for determining whether there is an abnormality, based on the standardized gain; and
controlling a display device to output an alarm in response to a determination that there is abnormality, based on the standardized gain, wherein the computer is configured to make the determination with increased sensitivity to changes in a frequency spectrum and using an alarm threshold automatically derived from a statistical distribution based on a pre-defined significance level, without setting empirical thresholds for each rotational order.

* * * * *